United States Patent
Vogel

(12) United States Patent (10) Patent No.: US 11,895,982 B2
Vogel (45) Date of Patent: Feb. 13, 2024

(54) CAT FURNITURE WITH PANEL ELEMENTS

(71) Applicant: Susanna Vogel, Salzburg (AT)

(72) Inventor: Susanna Vogel, Salzburg (AT)

( * ) Notice: Subject to any disclaimer, the term of this patent is extended or adjusted under 35 U.S.C. 154(b) by 124 days.

(21) Appl. No.: 17/285,926

(22) PCT Filed: Oct. 17, 2019

(86) PCT No.: PCT/EP2019/078198
§ 371 (c)(1),
(2) Date: Apr. 16, 2021

(87) PCT Pub. No.: WO2020/079138
PCT Pub. Date: Apr. 23, 2020

(65) Prior Publication Data
US 2021/0386034 A1 Dec. 16, 2021

(30) Foreign Application Priority Data

Oct. 18, 2018 (EP) .................................... 18201347

(51) Int. Cl.
*A01K 1/035* (2006.01)
*F16B 5/00* (2006.01)

(52) U.S. Cl.
CPC ............ *A01K 1/035* (2013.01); *F16B 5/0004* (2013.01)

(58) Field of Classification Search
CPC .. A01K 1/033; B65D 5/4266; B65D 2301/10; A63F 2009/1244; A63F 9/12; A63H 33/084; A63H 3/52
USPC ....................................................... 119/28.5
See application file for complete search history.

(56) References Cited

U.S. PATENT DOCUMENTS

| | | | | |
|---|---|---|---|---|
| 3,479,990 A * | 11/1969 | Crow | ................... | A01K 15/024 248/200.1 |
| 4,745,835 A * | 5/1988 | Schnitzer | .................. | B26F 1/18 83/660 |
| 4,803,952 A * | 2/1989 | Houser | ................... | A01K 1/033 119/499 |
| 5,005,758 A * | 4/1991 | Richards | ................ | B65D 27/00 229/80 |
| 5,320,065 A | 6/1994 | Leopold | | |
| 5,383,422 A * | 1/1995 | Morris | ................... | A01K 1/033 119/168 |
| 5,465,686 A * | 11/1995 | Monetti | ................. | A01K 1/033 119/168 |
| 5,875,735 A * | 3/1999 | Bradley | ............... | A01K 15/024 119/706 |

(Continued)

FOREIGN PATENT DOCUMENTS

| | | |
|---|---|---|
| DE | 102016112211 A1 | 1/2018 |
| WO | 2011071866 A1 | 6/2011 |
| WO | 2012109096 A1 | 8/2012 |

*Primary Examiner* — Brady W Frazier
*Assistant Examiner* — Zoe Tam Tran
(74) *Attorney, Agent, or Firm* — Smartpat PLC

(57) ABSTRACT

Cat furniture having at least one three-dimensional structure is composed of at least two panel elements which are connected together at at least one of their panel edges. One individual panel element is provided on at least one of its panel edges with a fastening means by means of which a connection with the fastening means of an adjacent panel element is to be made. The fastening means is attached in a foldable manner to the panel element via a perforation and via at least one groove extending along the perforation.

12 Claims, 9 Drawing Sheets

(56) References Cited

U.S. PATENT DOCUMENTS

| | | | | |
|---|---|---|---|---|
| 6,758,167 B1* | 7/2004 | Edelinski | ............... | A01K 1/033 |
| | | | | 119/498 |
| 7,938,084 B2* | 5/2011 | Scott | ....................... | A01K 5/01 |
| | | | | 119/65 |
| 8,695,533 B1* | 4/2014 | Mulligan | ............... | A01K 1/035 |
| | | | | 119/28.5 |
| 2003/0138598 A1* | 7/2003 | Rawlings | ............. | B42D 15/008 |
| | | | | 428/131 |
| 2003/0221628 A1* | 12/2003 | Leon | .................... | A01K 15/024 |
| | | | | 119/28.5 |
| 2004/0018330 A1* | 1/2004 | McDonald | ........... | B42D 15/008 |
| | | | | 428/126 |
| 2005/0051108 A1* | 3/2005 | Syrigos | .................. | A01K 1/035 |
| | | | | 119/416 |
| 2011/0309135 A1 | 12/2011 | Carbone et al. | | |
| 2013/0015090 A1 | 1/2013 | Bates et al. | | |
| 2013/0036986 A1 | 2/2013 | Callari | | |
| 2014/0137504 A1* | 5/2014 | Hedler | .................. | E04B 1/3211 |
| | | | | 52/582.1 |
| 2014/0274432 A1 | 9/2014 | Tsai et al. | | |
| 2018/0313377 A1* | 11/2018 | Balint | .................. | A63H 33/084 |
| 2019/0297837 A1* | 10/2019 | Tsai | ........................ | A01K 1/033 |

* cited by examiner

CAT FURNITURE WITH PANEL ELEMENTS

CROSS-REFERENCE TO RELATED APPLICATIONS

This application is a national stage application, filed under 35 U.S.C. § 371, of International Patent Application No. PCT/EP2019/078198, filed Oct. 17, 2019, which claims the benefit of European Patent Application No. 18201347.4, filed Oct. 18, 2018.

TECHNICAL FIELD

The disclosure relates to cat furniture having at least one three-dimensional structure.

BACKGROUND

Cat furniture, such as, for example, a cat scratching post, a cat cave or a cat climbing wall, is furniture which is matched to the specific needs of house cats. House cats are tamed wild cats which are kept by their owner in an apartment or house and often are not allowed to go out, especially in built-up urban areas. Cats which can be allowed to go out are able to satisfy their specific needs, such as, for example, sharpening their claws, exploring, investigating, stalking, watching and lying in wait, outdoors on outside objects. House cats, on the other hand, must be given an opportunity to act out those needs in the apartment or house in question.

In an apartment or house, particular attention should therefore be given to providing species-appropriate activities, diversion and separate areas for cats which are aimed at their needs, which meet the needs of claw sharpening, exploring, investigating, stalking, watching and lying in wait. By means of appropriate cat furniture, it is possible to prevent cats from using alternative fixtures, such as doors or furniture, instead and thereby damaging them.

Cat furniture is generally known on the market which as a rule consists of a plurality of components which are permanently joined together. The components are generally a base plate, one or more posts, a platform and a cat cave. The cat cave is in most cases composed of panels which are connected together at their panel edges to form a box. The box has an opening on one side so that the house cat can enter the cat cave.

SUMMARY

The problem on which the invention is based is to provide cat furniture which meets the needs of a house cat particularly well.

The problem is solved by cat furniture having at least one three-dimensional structure which is composed of at least two panel elements which are connected together at at least one of their panel edges. The individual panel element is provided on at least one of its panel edges with a fastening means, by means of which a connection with the fastening means of an adjacent panel element is to be made. The fastening means is attached in a foldable manner to the panel element via or by means of a perforation and via or by means of at least one groove extending along the perforation.

The fastening means is provided to connect the at least two panel elements to one another in a flexible and at the same time stable manner in respect of a design of the three-dimensional structure. The fastening means is to that end attached to the panel element in a foldable manner by means of a perforation and additionally by means of a groove extending along the perforation. The fastening means is then mounted on the panel element particularly easily and at the same time in a pre-defined manner to be pivotable about a type of hinge or an axis. The fastening means is thus to be pivoted by means of the hinge upwards or downwards out of the panel plane of the panel element. Advantageously, it is thus possible, by connecting two panel elements, to produce a varied three-dimensional structure or a three-dimensional object, the shape of which can easily be changed by pivoting the fastening means relative to the associated panel element.

The fastening means is connected to the panel element via a perforation. A perforation is a series of holes, slots or cuts in the panel plane of the panel element, which are preferably in a regular arrangement. The perforation is then advantageously provided in a linear or straight manner along the panel edge of the panel element, wherein in particular the individual holes are slot-like. By means of the perforation, the panel element is weakened in some regions. A type of bending edge is thus formed, at which the fastening means on the fastening element is to be folded. By advantageously choosing the quantity, shape and size of the holes, the foldability of the fastening means can be influenced.

The fastening means is further attached to the panel element in a foldable manner by means of a groove which extends along the perforation. The groove creates a further reduction in the cross-sectional area that connects the panel element to the fastening element, at the point or in the region of the above-mentioned material weakening. At the same time, the groove creates a line along which the fold axis forms on pivoting. The groove also provides sufficient free space in order that pivoting of the fastening means is easy for the user of the cat furniture and is possible without excessively distorting the material at the fold axis.

The perforation is preferably formed with individual slots having a slot length of between 1.0 mm and 1.8 mm, preferably between 1.3 mm and 1.5 mm. Such a slot length is technically easy to produce and at the same time creates optimal movability between the associated panel element and the adjacent fastening means.

The perforation is preferably formed at the end of a panel edge (26) with a slot having a slot length of between 0.5 mm and 0.9 mm, preferably between 0.6 mm and 0.8 mm. Such a slot at the end of the panel element creates additional movability there on pivoting of the fastening means and at the same time ensures that the arrangement is not excessively weakened in that region.

The perforation of the cat furniture is further advantageously formed with individual ties having a tie length of between 0.2 mm and 0.8 mm, preferably between 0.4 mm and 0.6 mm, with a view to achieving an optimum between strength and movability.

There is further provided cat furniture, which advantageously can in particular also have the features mentioned above, having at least one three-dimensional structure which is composed of at least two panel elements which are connected together at at least one of their panel edges, wherein the individual panel element is provided on at least one of its panel edges with a fastening means by means of which a connection with the fastening means of an adjacent panel element is to be made. The fastening means is thereby formed by means of an adhesive material.

Adhesive material is here understood as meaning a material which has the ability to build up adhesive forces with the surface of another substance or component. These adhesive forces are based on the interaction of adhesion. The adhesive forces are in most cases based on physical interactions, such as, for example, on interactions between polar or polarisable groups, on hydrogen bridge bonds or so-called van der Waals forces. By means of such an adhesive material, it is possible in the case of the three-dimensional structure to connect its panel elements together in a simple and at the same time permanently stable manner.

The adhesive material is preferably formed by a double-sided adhesive tape. Such an adhesive tape can easily be handled by a user of the cat furniture and at the same time can develop high adhesive forces.

In the case of the cat furniture, a support element for the three-dimensional structure is further preferably provided. Such a support element can preferably be a plate for fastening to a wall or a post for a standing arrangement. The adhesive material is advantageously adapted to be adhesively bonded to a support surface of the support element. In this manner, a connection can in this manner be made both between two panel elements and between a panel element and the support device. Particularly preferably, as stated, the support element is a plate which can simply be placed on the floor or hung on a wall or the like. The plate then serves as a stable flat base to which a plurality of the panel elements according to invention can be fastened. The panel elements, together with the plate, then form a strong three-dimensional structure which the cat in question can climb and explore. The plate as such can be fastened to the wall by conventional fixing means, such as, for example, dowels and screws, or, more simply, can even be adhesively bonded thereto.

The support element is preferably further adapted to be adhesively bonded to a fastening surface outside the cat furniture, such as a building wall. The mentioned panel elements can then be fixedly arranged directly on the support element fixedly fastened to a building wall in that manner.

The disclosure is further also directed to a method for producing cat furniture, in particular cat furniture of the type mentioned above, having at least one panel element, which method comprises the following steps: providing at least one plastics raw material, producing a plurality of different plies of needle felt from the at least one plastics raw material and felting the plies of needle felt to form a needle felt layer, and compressing the needle felt layer with the input of heat.

With such a method it is possible to produce panel elements which on the one hand meet the scratching needs of cats in a particularly appropriate manner and which at the same time have high wear resistance and durability. Such panel elements in particular do not require an additional support structure. In addition, such panel elements meet very high aesthetic demands and, on account of their layered structure, can be provided with a wide variety of properties in terms of rigidity, flexibility and surface condition.

The input of heat in such a production method takes place preferably at a temperature of between 180° C. and 250° C., in particular between 210° C. and 220° C.

The individual panel element is made from felt, namely plastics felt. Felt is a textile structure of a random fibre material which can be separated only with difficulty. Felt is generally felted by dry needling or by solidification with a water jet which strikes the fibre material under high pressure. An advantage of felt for the solution is that plastics felt is generally moisture-repellent.

The cat furniture produced from felt is therefore particularly hygienic, durable and easy to look after. The panel element is produced in particular from the plastics material polyethylene (PE) or polyethylene terephthalate (PET). Such plastics felt additionally has the property that it can be produced with greater bending resistance than felt of natural raw materials. In a plastics felt, the fibres of the felt are bonded and compressed together better on compression moulding, and the felt is more rigid as a result. The felt modules, which are thus easy to look after, can be recycled by type to the relevant material cycle at the end of their product life.

The advantages achieved with the invention are in particular also that the product can be supplied in a flat pack and rebuilt and dismantled at any time. Each product can be connected with only a few manoeuvres. The material properties of the product allow long-lasting and hygienic use.

The individual panel element of the cat furniture is further preferably in the form of a separate polygon and provided on at least two, in particular on each, of its polygon edges with a fastening means by means of which a connection with the fastening means of an adjacent panel element is to be made.

Such a panel element which is advantageous is a flat, plate-shaped element which is in the form of a polygon. A polygon has more than two polygon edges and more than two polygon vertices. The polygon edges delimit the panel element and are substantially straight, in particular completely straight. The polygon edges of the panel element thus intersect or meet at the polygon vertices. Such polygons are also referred to in mathematics as a simple polygon.

Preferably, the individual panel element in polygon form is provided with a fastening means on at least two, in particular on each, of its polygon edges. With the fastening means, a first polygon and an adjacent second polygon are to be fixedly connected together at their respective polygon edges. The two polygons then together form a new, joint panel element. In this manner, a new three-dimensional structure is in particular formed from the polygons connected together in that manner. For this purpose, the polygon edges of adjacent panel elements are in particular of equal length. The advantage of such panel elements is that, by means of the panel elements, an individual piece of cat furniture which can be adapted to particular conditions can be configured. This piece of cat furniture is thus to be assembled in modular manner from individual, separate panel elements by means of the fastening means.

The advantageous configuration is based on the finding that conventional cat furniture does not actually meet the needs of house cats. Especially because of the permanently assembled structure of conventional cat furniture, the house cat's need to explore, investigate, stalk, watch and lie in wait is not sufficiently satisfied. The house cat becomes bored and abandons the cat furniture. In addition, because of its inflexible construction, conventional cat furniture cannot optimally be adapted to conditions in the living space. The configuration serves to supplement and expand the cat's living space by allowing it access to hitherto unexplored territory, or entirely new territory can be created. The invention serves as the basis for the species-appropriate adaptation of each individual living situation to the needs of cats. The invention allows the cats to actually "climb" the walls and thus provides them with new movement areas within the apartment.

According to an advantageous further development of the solution, the fastening means is formed with a strip-like edge surface extending along the polygon edge of the panel element. This edge surface extends at the polygon edge and generally has a constant width. One side edge of the edge surface is then delimited by the polygon edge, the second side edge of the edge surface extends oriented outwards, parallel to the polygon edge. Advantageously, the edge surface is in such a form that, on connection to an adjacent panel element, it forms a contact surface with the edge surface thereof. By means of this contact surface of the two edge surfaces, a connection is then already made on the basis of friction. In particular, however, the two edge surfaces are advantageously connected together by means of at least one connecting element. To that end, two fastening points are advantageously formed on the two edge surfaces. Fixed but nevertheless releasable connections are then to be made at these fastening points by means of a respective connecting element. The fastening points are preferably each in the form of a hole in the edge surface of the panel element. Matched to the hole, the connecting element is advantageously in the form of a screw connection, plug-in connection or clip connection. Alternatively or in addition, the edge surfaces are connected together at their contact surfaces, as discussed above, in particular adhesively bonded over their surfaces, by means of an adhesive material, preferably a double-sided adhesive tape.

Preferably, at least one panel element is further in the form of a convex polygon. In a convex polygon, all the interior angles are smaller than 180 degrees. The panel element is then advantageously produced in the form of a triangle, a quadrilateral or a pentagon. With such a convex polygon, the user can particularly easily assemble from a plurality of panel elements a variable piece of cat furniture which is to be individually configured.

Further advantageously, at least one panel element is in the form of an equiangular polygon, in particular in a plane. An equiangular polygon is a polygon in which all the interior angles of the polygon are of equal size. By means of an equiangular polygon, cat furniture which, on account of the equal angles, has a regular structure can particularly advantageously be assembled. The individual panel element is particularly advantageously in the form of an equiangular triangle.

Furthermore, the panel element is advantageously in the form of a regular polygon, in particular in a plane. A regular polygon or isogon is a polygon in which the sides are of equal length and all the interior angles are of equal size. This type of polygon offers a particularly simple possibility of configuring cat furniture. The cat furniture can thereby be variably configured and at the same time has a regular structure. Because preferably many panel elements have equal side lengths, the panel elements can be combined as desired. Particularly preferably, the individual panel element is in the form of a regular, equilateral triangle.

The cat furniture is further advantageously configured with at least one first panel element which is in the form of an equilateral triangle with three first side lengths, and with at least one second panel element which is in the form of a first isosceles triangle with two first leg lengths and a first base length, wherein its first leg lengths each correspond to the first side length. Panel elements of this configuration allow the first panel element and the second panel element having the first side length and the first leg length to be connected. The flexibility and variety in the production of the cat furniture is thus increased.

The cat furniture is preferably further configured with at least one third panel element which is in the form of a second isosceles triangle having two second leg lengths and a second base length. The third panel element is in such a form that its second leg lengths each correspond to the first base length. This third panel element has the result that, together with the first and the second panel element, a modular system is formed. Thus, a highly flexible overall structure with many variants can be constructed with only three different panel elements.

BRIEF DESCRIPTION OF THE DRAWINGS

An exemplary embodiment of the solution will be described in greater detail hereinbelow with reference to the accompanying schematic drawings.

DETAILED DESCRIPTION

Figure 1:
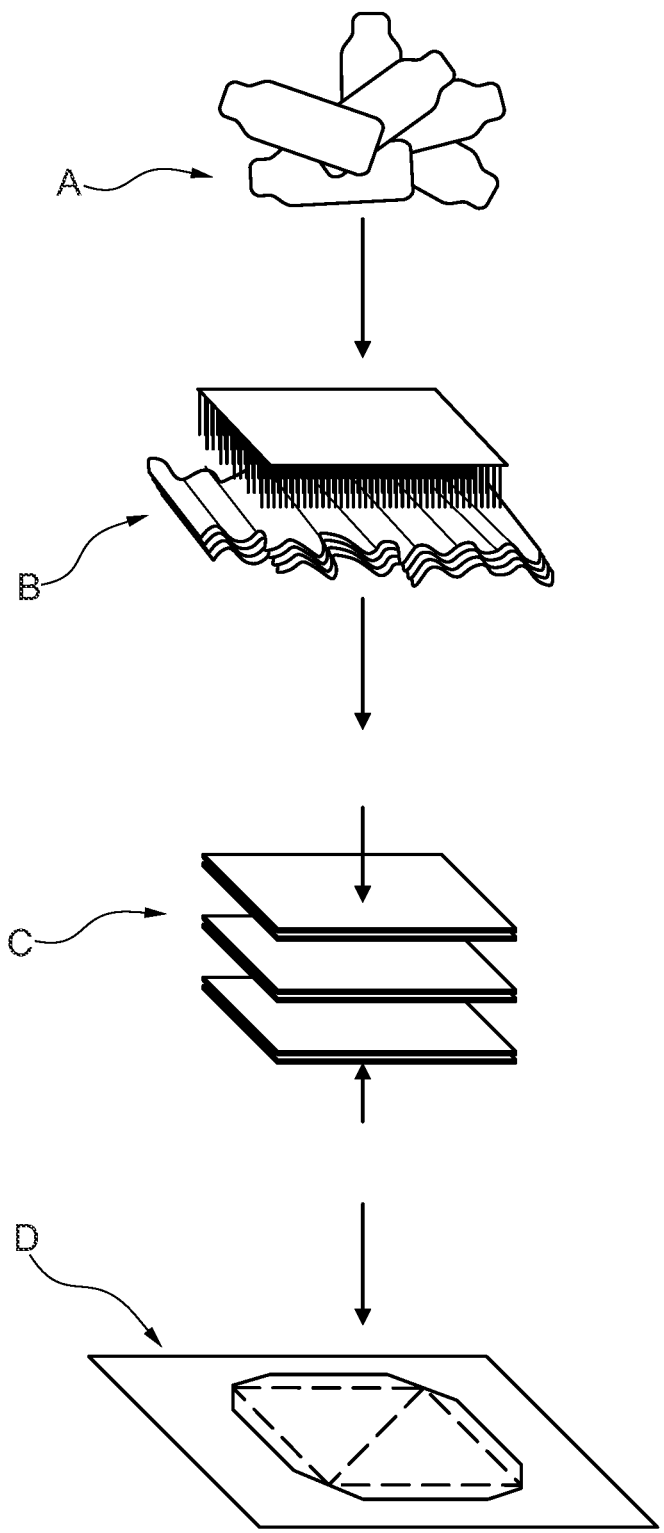
FIG. 1 is a flow diagram of a method for producing cat furniture.

FIG. 1 shows part of a method for producing cat furniture 10. Four steps A, B, C and D of the method are shown. In step A, plastics raw material of various grades is provided. The plastics raw material is preferably from the recycling of plastics bottles. The plastics chips thereby obtained are preferably made of polyethylene (PE) and/or of polyethylene terephthalate (PET). Plastics threads are produced from these plastics chips by means of an extruder machine, and balls of threads are produced from the threads by means of a crimping machine. The balls of threads are processed in a felting machine to form individual plies of needle felt. A plurality of plies of needle felt are then placed in layers one above the other and felted together. This takes place in step B, where the individual plies of needle felt are densified by means of felt needles. A needle felt layer having a thickness of between 1 cm and 4 cm, preferably of between 2 cm and 3 cm thickness, particularly preferably of 2.5 cm thickness, is obtained.

In a step C, the needle felt layer is compressed by means of a pressing machine with the input of heat. To that end, the needle felt layer is first preheated to a temperature of between 180° C. and 250° C., in particular between 210° C.

and 220° C., particularly preferably to a temperature of 215° C. The needle felt layer so heated is then placed between two cold plates of a pressing tool and compressed to a thickness of between 2 mm and 7 mm, preferably between 4 mm and 5 mm, particularly preferably of 4.5 mm thickness. The temperature of the plates is between 10° C. and 30° C., preferably between 15° C. and 25° C., particularly preferably 20° C. With such a temperature input and such compression of the needle felt layer by means of cold plates, the felt fibres of the needle felt layer bond together and consolidate. A single, particularly stable plastics felt layer is obtained.

In a step D, a panel element 24 is then punched out of this comparatively bending-resistant plastics felt layer by means of a punching machine, which panel element will be described in greater detail hereinbelow.

Figure 2:
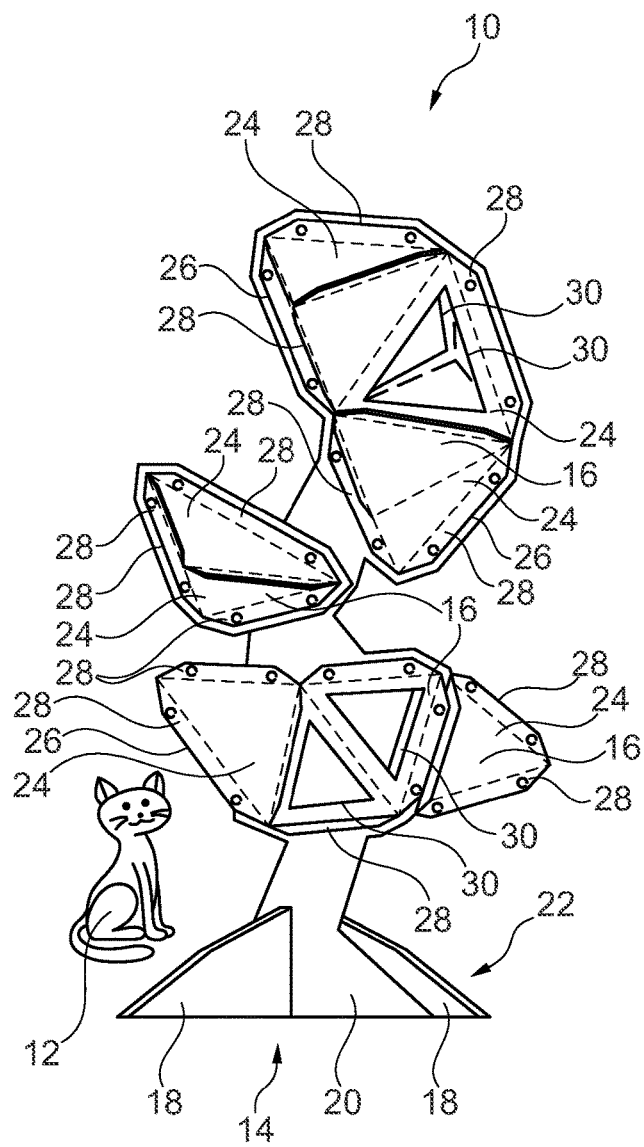
FIG. 2 is a side view of a first exemplary embodiment of cat furniture with panel elements.
Figure 3:
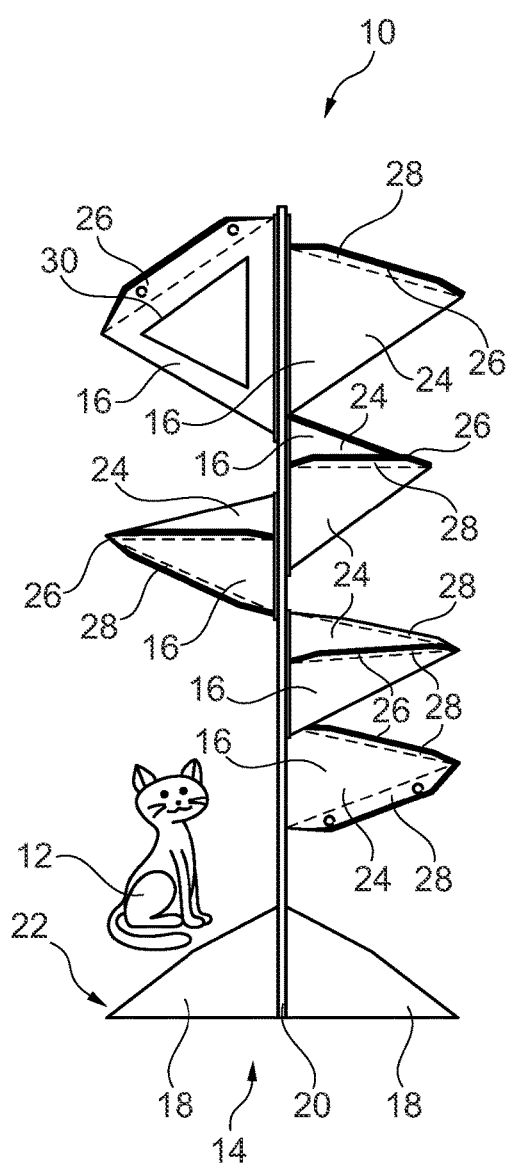
FIG. 3 is a front view of the first exemplary embodiment according to FIG. 2.

FIGS. 2 and 3 show the cat furniture 10 for a cat 12, having a base element 14 and a plurality of three-dimensional structures 16 which together form a type of cat tree. The base element 14 forms a type of support element and comprises two plate-like foot elements 18 and a plate-like trunk element 20. The foot elements 18 are arranged abutting the trunk element 20 at a right angle and form a type of trunk root 22 towards the base. This trunk root 22 is so configured that the base element 14 is prevented from tipping over.

The three-dimensional structure 16 is composed of a plurality of panel elements 24 in modular form. The panel elements 24 have been produced as described above and are each substantially in the form of a planar polygon. They each have at each of their panel edges 26 a fastening means 28.

The fastening means 28 of one of the panel elements 24 is in particular connected to the fastening means 28 of an adjacent panel element 24. The panel elements 24 which adjoin the trunk element 20 are fixedly connected to the trunk element 20 by their fastening means 28 facing the trunk element 20. Some of the panel elements 24 have through-openings 30.

Figure 4:
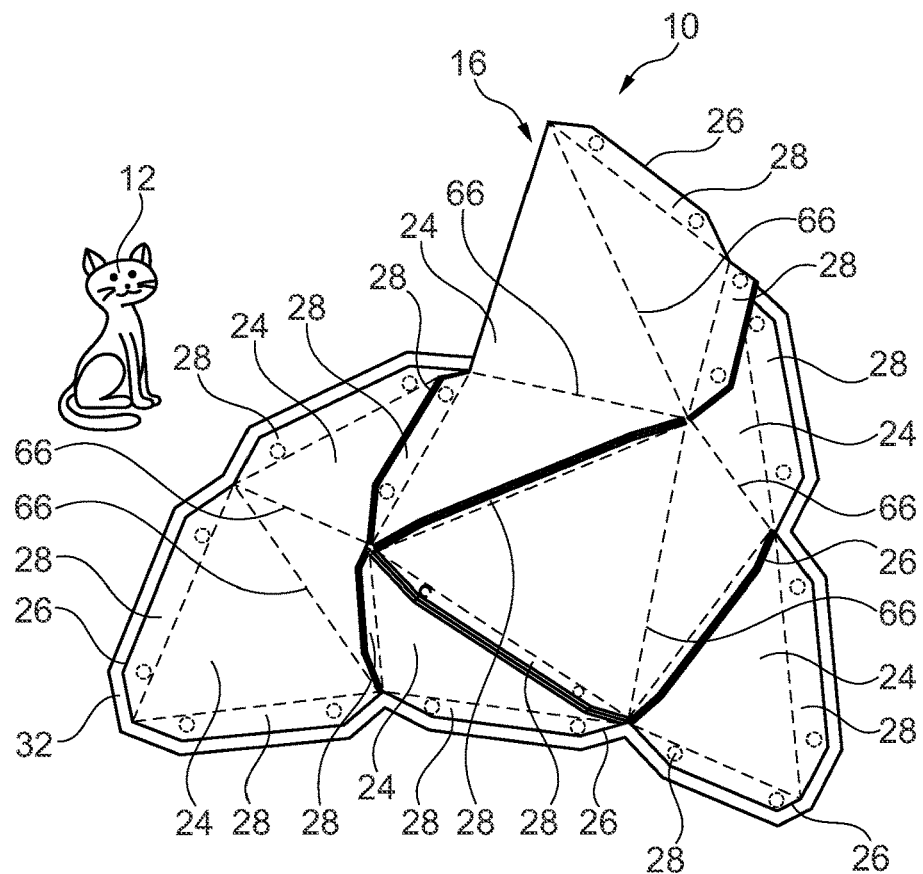
FIG. 4 is a plan view of a second exemplary embodiment of cat furniture.

FIG. 4 shows cat furniture 10 in which the support element, in a particularly advantageous manner, is in the form of a single, simple and thus comparatively large wall plate or base plate 32. The associated three-dimensional structure 16 is fixedly connected to the base plate 32, which can also be fastened to a building wall or the like. As in FIGS. 2 and 3, the three-dimensional structure 16 according to FIG. 4 is composed of a plurality of modular panel elements 24. Here too, these panel elements 24 are connected together by means of fastening means 28. The panel elements 24 adjoining the base plate 32 are connected to the base plate 32 by means of the fastening means 28 facing the base plate 32. This cat furniture 10 also has a through-opening, but this is not shown here.

According to FIGS. 2 to 4, the panel elements 24 allow various, different and variable three-dimensional structures to be created by means of the fastening means 28. The three-dimensional structures 16 can be fastened to base elements 14 of different shapes. It is, however, also possible for a plurality of different three-dimensional structures 16 to be connected to the same base element 14. The base element 14 and the particular three-dimensional structure 16 together form the cat furniture 10. Also possible, but not shown here, is cat furniture which is composed only of a plurality of panel elements 24.

It is further possible to dismantle the cat furniture 10 into its panel elements 24 and the base element 14 again and, on the basis of the base element 14, to create a new, differently shaped three-dimensional structure 16 by means of the panel elements 24. This new three-dimensional structure 16, together with the base element 14, then forms cat furniture 10 of a different type. Cat furniture 10 that is already known to the cat 12 is thus converted into cat furniture 10 that is new to the cat 12.

The cat 12 is able to climb onto the cat furniture 10 according to FIGS. 2 to 4. The cat 12 additionally has the possibility of entering the three-dimensional structure 16 through the through-openings 30 and of using the inside of the three-dimensional structure 16 as a resting place, for example. In addition, the cat furniture 10 in particular with its trunk element 20 and also its three-dimensional structures 16 can be used by the cat 12 as a scratching object for sharpening its claws.

FIGS. 5 to 10 show panel elements 24 in different forms. The panel elements 24 comprise a largely planar base plate 34 which has been produced from a comparatively rigid plastics felt. The base plate 34 is divided by means of a perforation 36 into a basic form 38 and the respective fastening means 28. The basic form 38 is in each case in the form of a planar, convex polygon, at the polygon edges of which the perforations 36 extend.

The perforation 36 is formed by means of slots, or elongate holes 40 which are rectangular in a plan view, which are oriented linearly and arranged spaced apart from one another. Alternatively, the elongate holes or slots 40 are advantageously in the form of simple, linear longitudinal slots, as will be explained in greater detail hereinbelow. The slots 40 pass through the base plate 34 completely. The perforation 36 weakens the base plate 34 in such a manner that a type of hinge is formed in the associated region. The fastening means 28 can as a result be pivoted at the perforation 36 upwards or downwards out of the plane of the base plate 34.

In an embodiment which is not shown here, the perforation 36 is formed by means of holes which are round or oval when seen in a plan view. The perforation 36 can further advantageously not pass through the base plate 34 completely but be in the form of a weakening of the thickness of the base plate 34.

The fastening means 28 attached to the polygon-shaped basic form 38 has a trapezium shape with a first side 42, a second side 44, a third side 46 and a fourth side 48. The first side 42 of the trapezium faces towards the basic form 38, it is attached to the basic form 38 by means of the perforation 36. The third side 46 of the trapezium extends parallel to the first side 42. The second side 44 and the fourth side 48 form a slope towards the third side 46 at the respective ends of the trapezium. The corner angles of this slope are of the same size as the adjacent corner angles of the polygon-shaped basic form 38.

Figure 10:
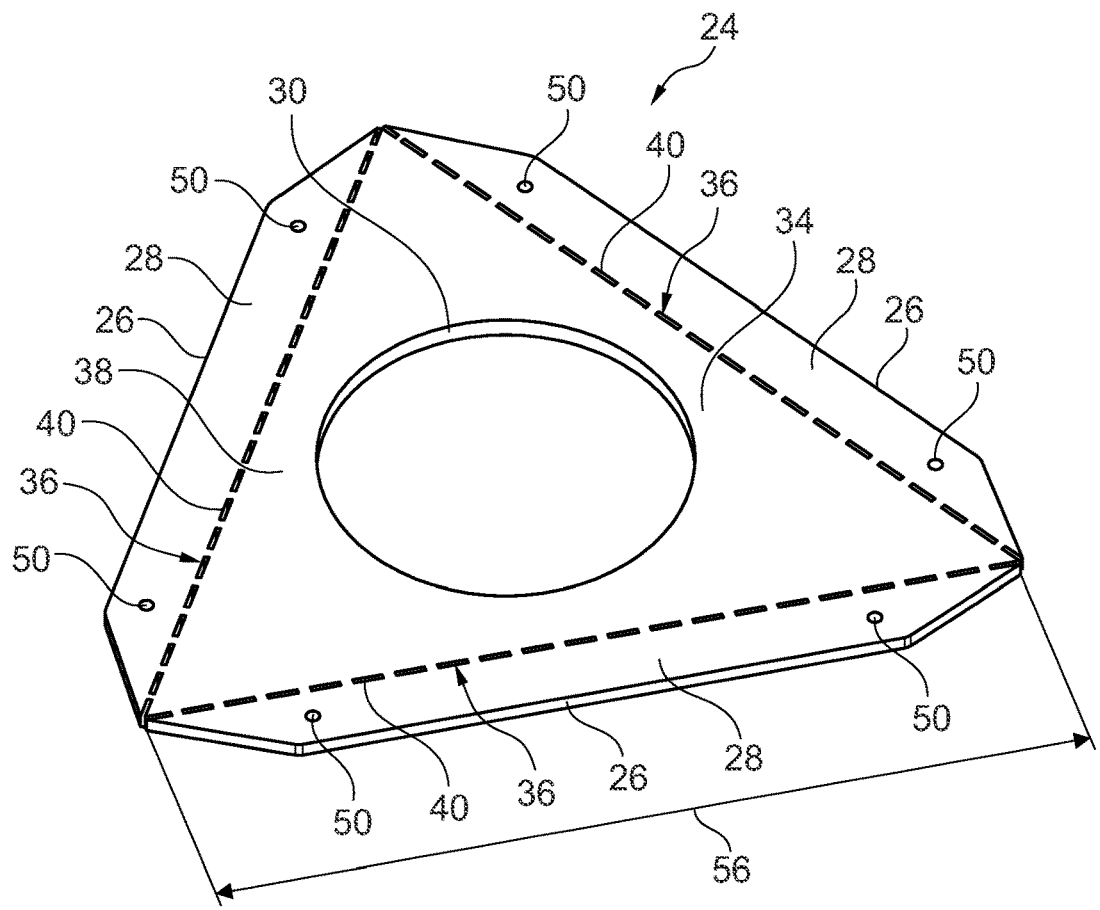
FIG. 10 is a perspective view of a sixth embodiment of a panel element.

The fastening means 28 has two fastening points 50 in the respective end regions of the trapezium. The fastening points 50 are in the form of holes in the base plate 34. A connecting element 52 according to FIG. 10 is to be guided through each of these fastening points 50. By means of the connecting element 52, panel elements 24 located next to one another are to be connected together.

Figure 5:
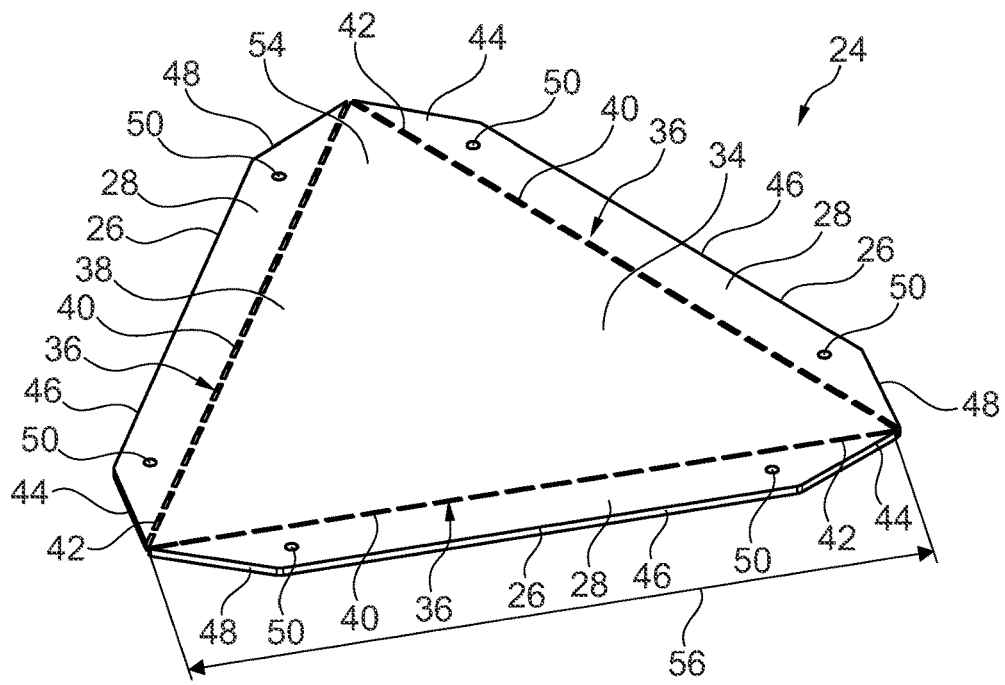
FIG. 5 is a perspective view of a first embodiment of a panel element.

FIG. 5 shows a panel element 24 whose polygon-shaped base form 38 is in the form of a equilateral triangle 54 having a first side length 56.

Figure 6:
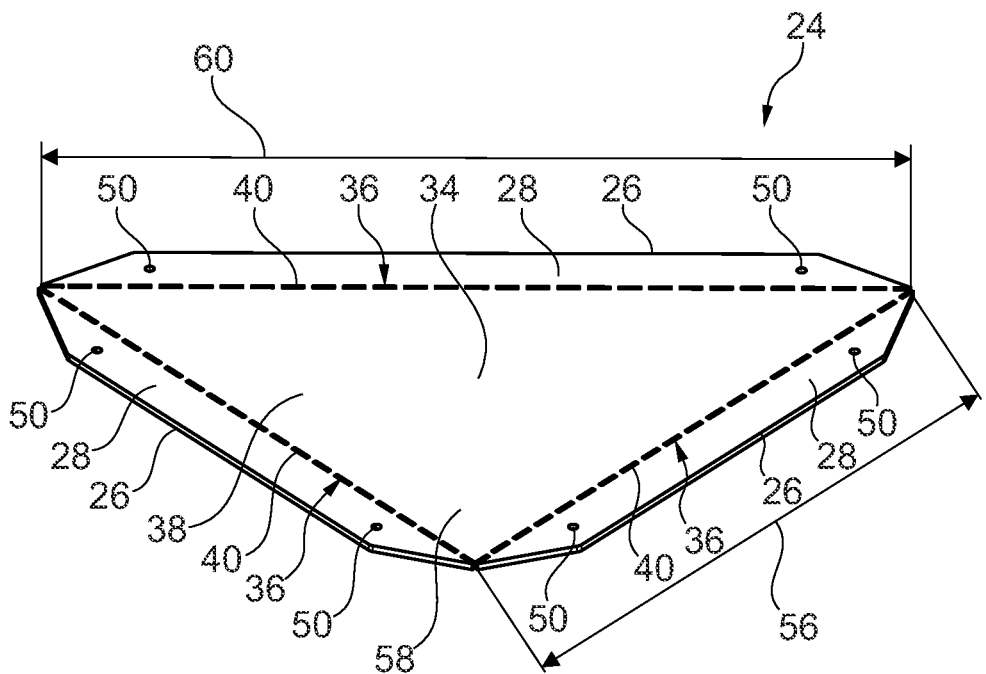
FIG. 6 is a perspective view of a second embodiment of a panel element.

FIG. 6 shows a panel element 24 having an isosceles triangle 58 as the polygon-shaped base form 38. The isosceles triangle 58 comprises a base having a first base length 60 and two legs of equal length. The two legs of the isosceles triangle 58 are the same length as the first side length 56 according to FIG. 4.

Figure 7:
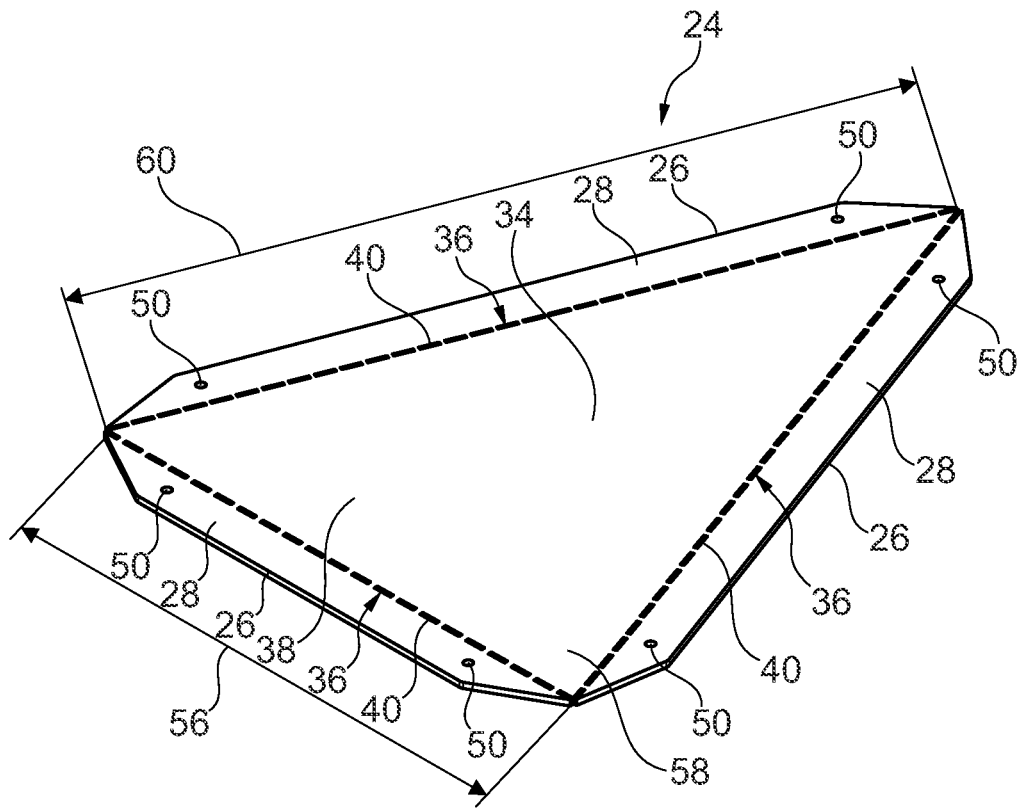
FIG. 7 is a perspective view of a third embodiment of a panel element.

According to FIG. 7, the panel element 24 therein is in the form of an isosceles triangle 58, of which the basic form 38 has as the basis the first side length 56 and the two legs have the length of the first base length 60.

Figure 8:
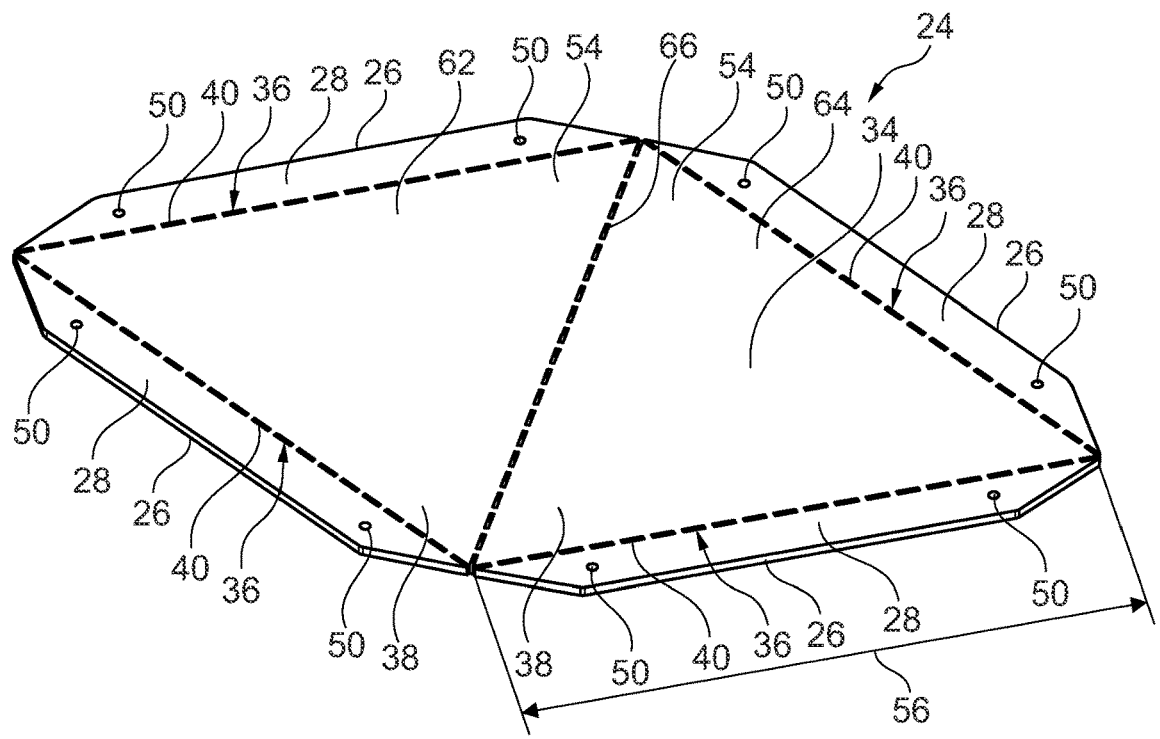
FIG. 8 is a perspective view of a fourth embodiment of a panel element.

FIG. 8 shows a panel element 24 in which the base plate 34 is composed of two basic forms 38 and four fastening means 28 attached to the two basic forms 38. The basic forms 38, as in FIG. 5, are two equilateral triangles 54 each having a first side length 56. A first basic form 62 of these two basic forms 38 is connected to the second basic form 64 at a connecting edge 66, which is formed by a perforation 36. This perforation 36, as already explained, acts as a type of hinge by means of which the base plate 34 is to be bent approximately in the middle. By means of the bending, a three-dimensional panel structure is thus to be produced.

The fastening means 28 are coupled to the two basic forms 38 likewise by means of a perforation 36. By means of the fastening means 28, this panel element 24 can then be connected to other panel elements 24 to form a larger three-dimensional structure 16. In addition, the panel element 24 is to be connected by means of the fastening means 28 to a trunk element 20 or a base plate 32.

The base plate 34 according to FIG. 7, as is not shown here, can also be composed of two isosceles triangles 58 according to FIG. 5 and FIG. 6 and with surrounding fastening means 28. The connecting edge 66 has either the first side length 56 or the first base length 60.

The panel element 24 according to FIG. 8 allows a three-dimensional structure to be constructed more quickly, because the production of a connection of two panel elements 24 according to FIGS. 5 to 7 is not necessary.

Figure 9:
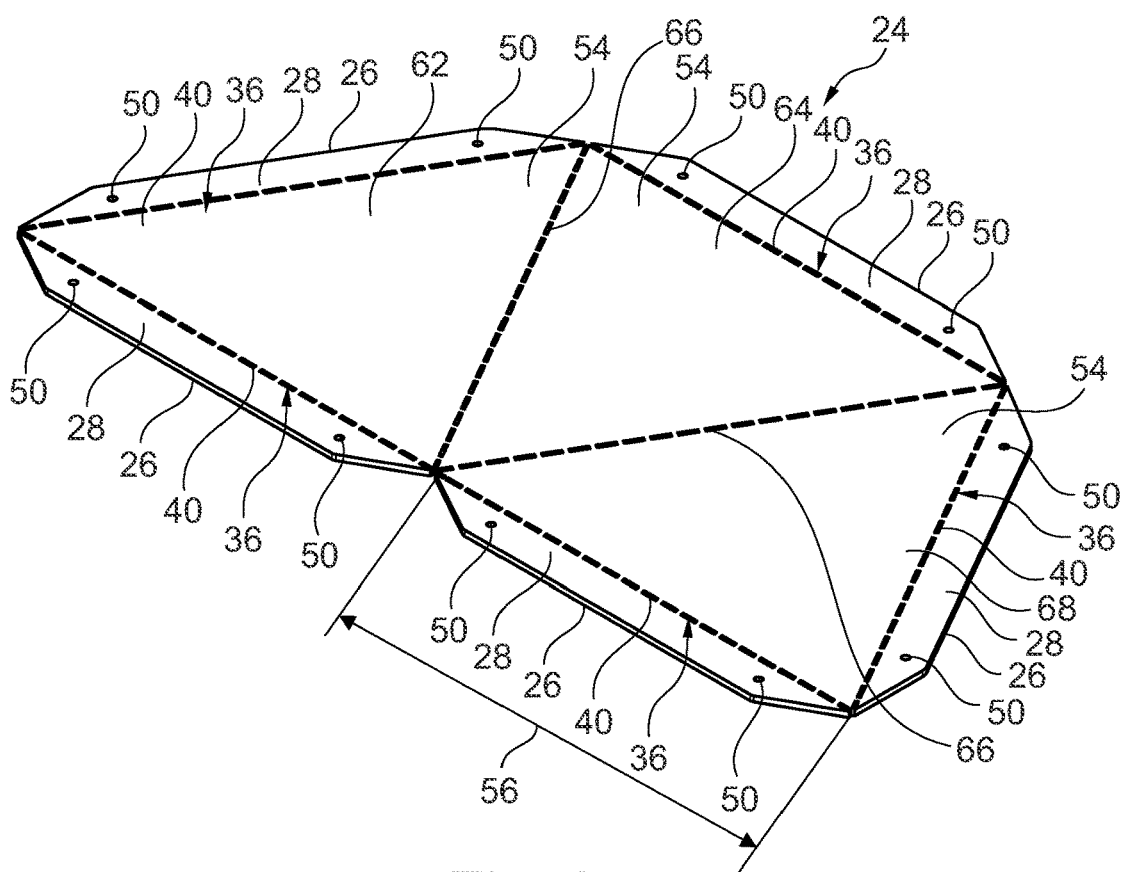
FIG. 9 is a perspective view of a fifth embodiment of a panel element.

FIG. 9 shows a panel element 24 in which the base plate 34 is composed of three basic forms 38, namely three equilateral triangles 54 and five fastening means 28 attached to the basic forms 38. As in FIG. 8, a first basic form 62 is connected to a second basic form 64 by means of a connecting edge 66. A third basic form 68 is attached to the second basic form 64 by at a further of its polygon edges. Here too, the fastening means 28 are arranged surrounding the assembled basic forms 62, 64 and 68.

The panel element 24 according to FIG. 9 allows a three-dimensional structure to be constructed even more quickly than with a panel element according to FIG. 8, since the production of two connections of three panel elements 24 according to FIGS. 5 to 7 is not necessary. In an exemplary embodiment not shown here, a panel element 24 is therefore further composed of more than three basic forms 38. This panel element 24 is then formed as a type of bending of the respective three-dimensional structure.

FIG. 10 shows a panel element 24 according to FIG. 5 in which a circular through-opening 30 is arranged in the middle of the base plate 34. This through-opening 30 is of such a size that it does not extend to any of the polygon edges of the basic form 38. As is also shown in FIG. 2, the through-opening 30 can alternatively have the shape of a triangle. The triangle can advantageously have rounded corners.

Figure 11:
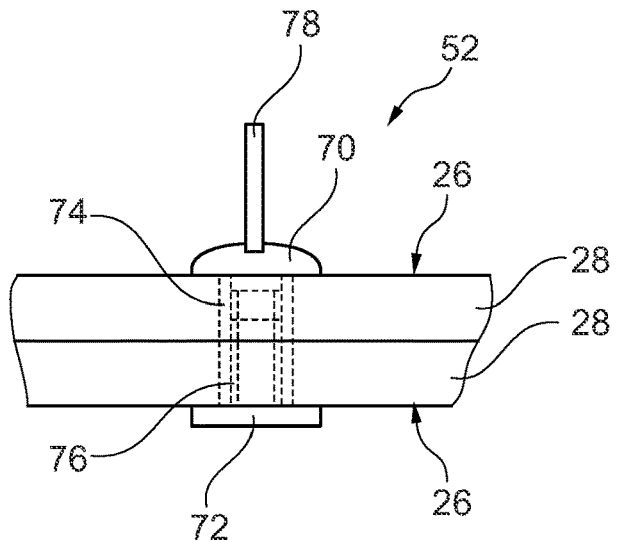
FIG. 11 is a side view of two panel edges with their fastening means and an associated connecting element.

FIG. 11 shows an embodiment of a connecting element 52 on two assembled fastening means 28 of two panel edges 26. The connecting element 52 comprises a screw element 70 and a screw 72. The screw element 70 is formed by a screw sleeve 74 having an internal thread 76. A screwdriver 78 can be placed on a head of the screw sleeve 74, and the screw sleeve 74 can thus be turned.

Figure 12:
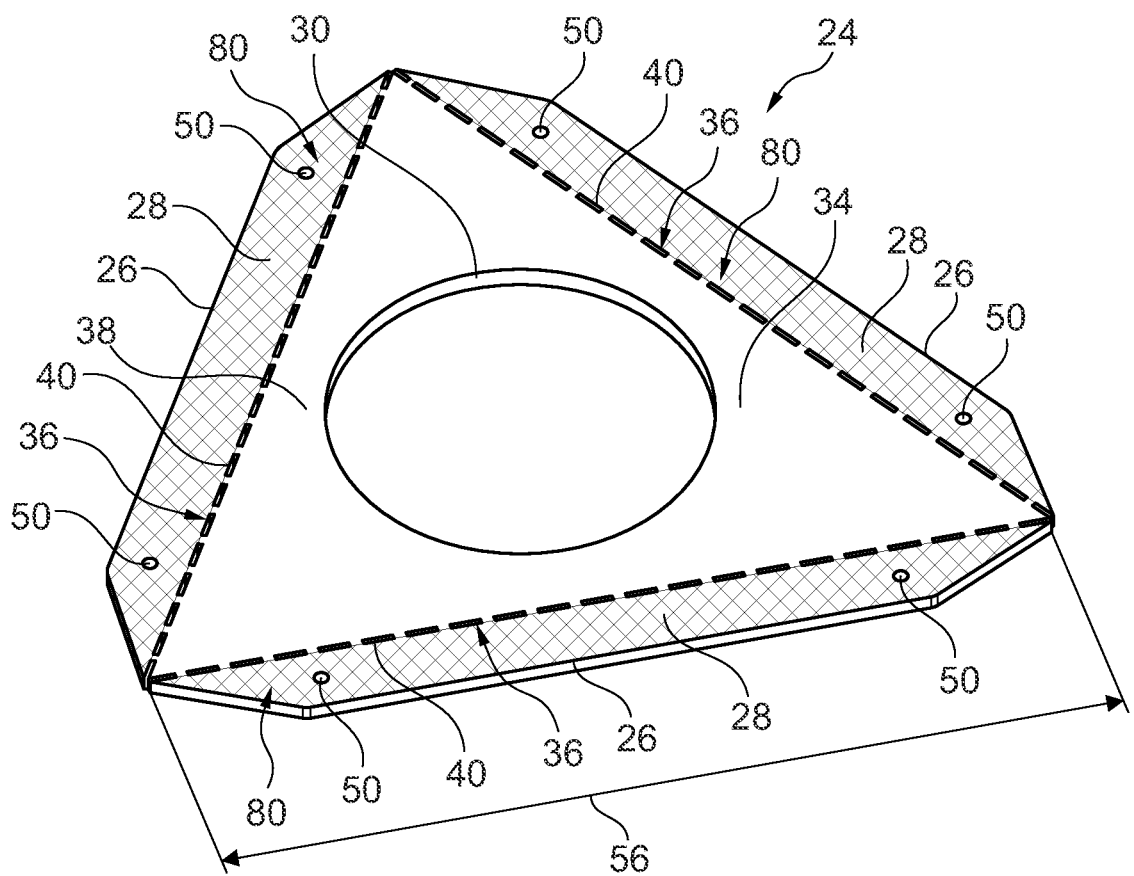
FIG. 12 is a perspective view of the panel element according to FIG. 10 with connecting elements and a second type of fastening means.
Figure 13:
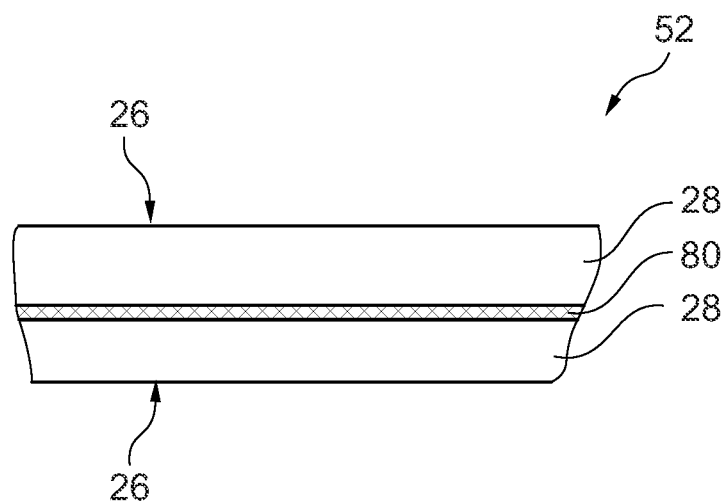
FIG. 13 is a side view of two panel edges with the fastening means according to FIG. 12.

FIG. 12 shows a form of the panel element 24 according to FIG. 10 in which not only are fastening points 50 provided on the fastening means 28, but an adhesive material 80 is also applied to the panel edges 26. The adhesive material 80 in the form of a double-sided adhesive tape is adhesively bonded to the respective panel edge 26 and covers the entire surface thereof. The adhesive material 80 is so chosen that it can be adhesively bonded either unreleasably or releasably to a panel edge 26 of another panel element 24, to a support surface or support plate of a support element, such as, for example, the trunk element 20, or directly to a wall surface. FIG. 13 shows how, by means of such an adhesive material 80, two panel edges 26 as fastening means 28 are bonded together.

Figure 14:
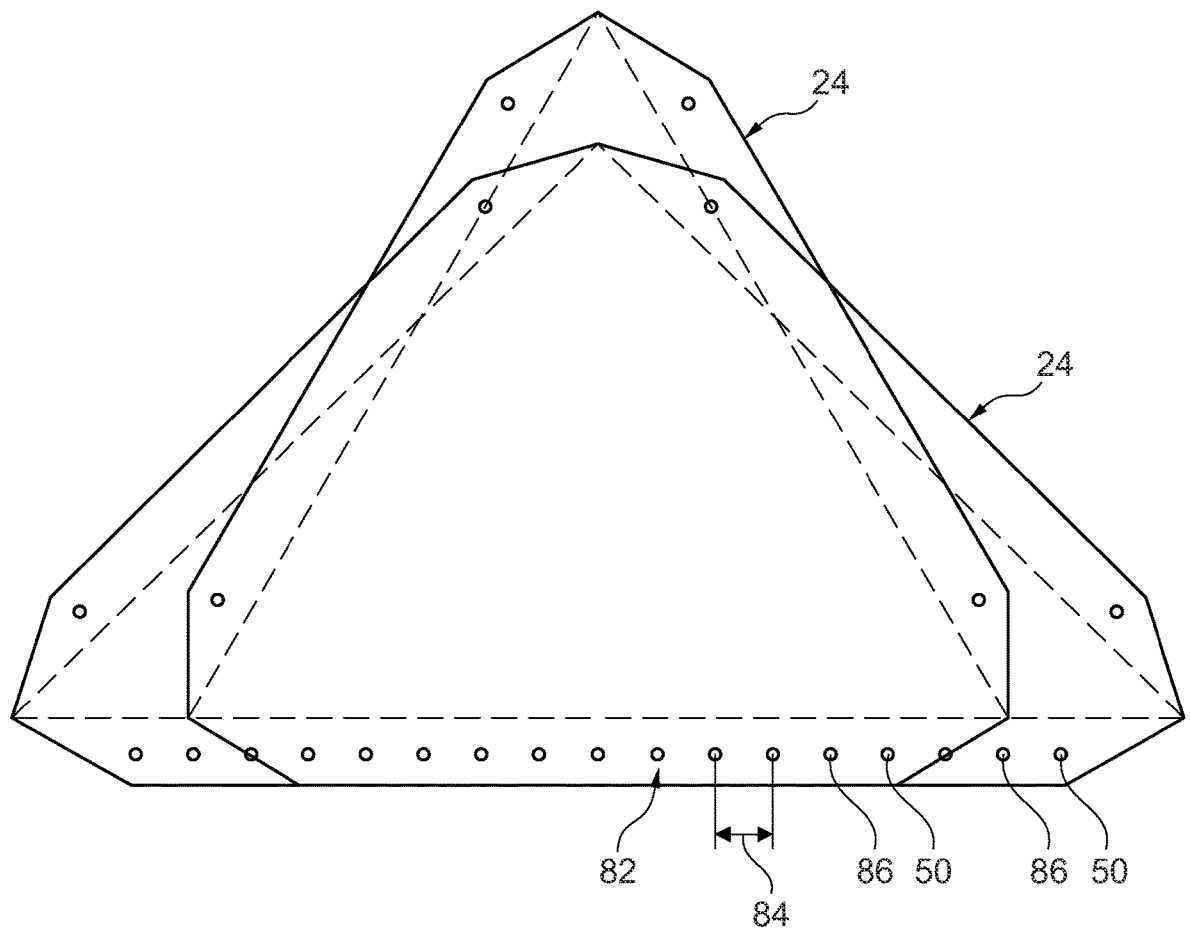
FIG. 14 is a plan view of two panel elements with their fastening means.

FIG. 14 shows a so-called point pattern 82 which is formed for the fastening points 50 on panel elements 24 of different types. The point pattern 82 defines a specific spacing 84 between points 86, at which the fastening points 50 can then be arranged as desired. By means of this defined point pattern 82, it is thus possible to fasten panel elements 24 of different shapes in particular to an associated support element.

Figure 15:
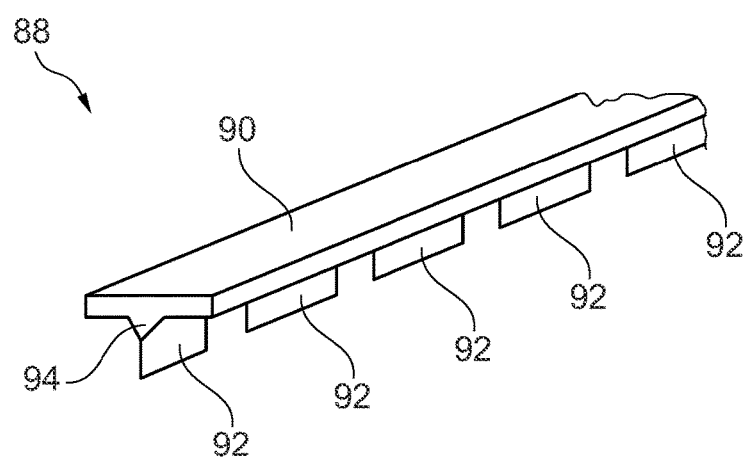
FIG. 15 is a perspective view of a tool for producing a perforation with a groove on a panel element.
Figure 16:
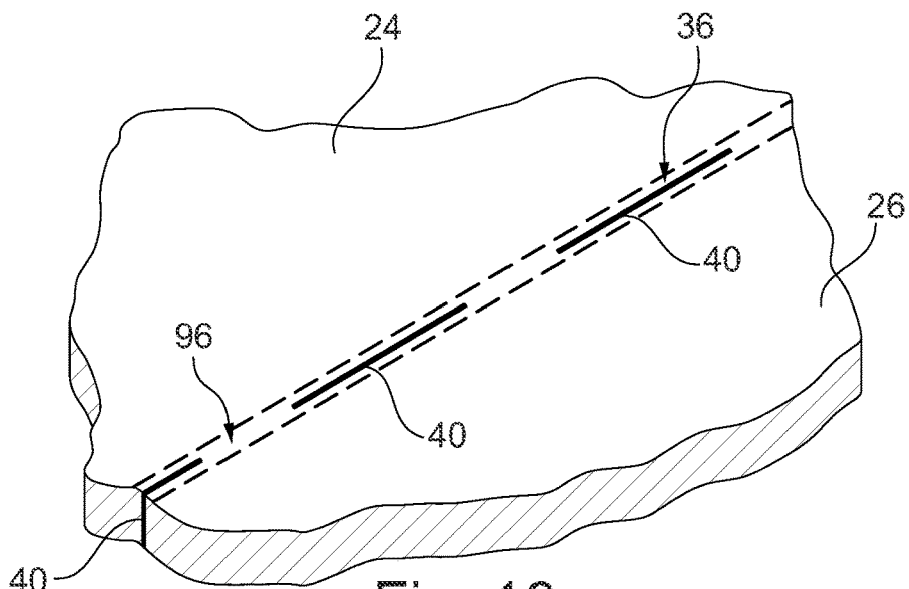
FIG. 16 is a perspective view of a perforation with a groove on a panel element in the unfolded state.
Figure 17:
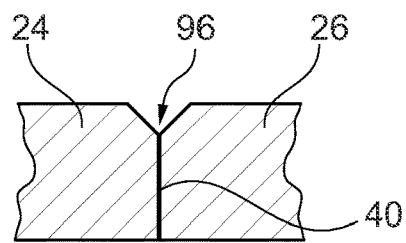
FIG. 17 is an enlarged side view of the perforation with a groove according to FIG. 16.
Figure 18:
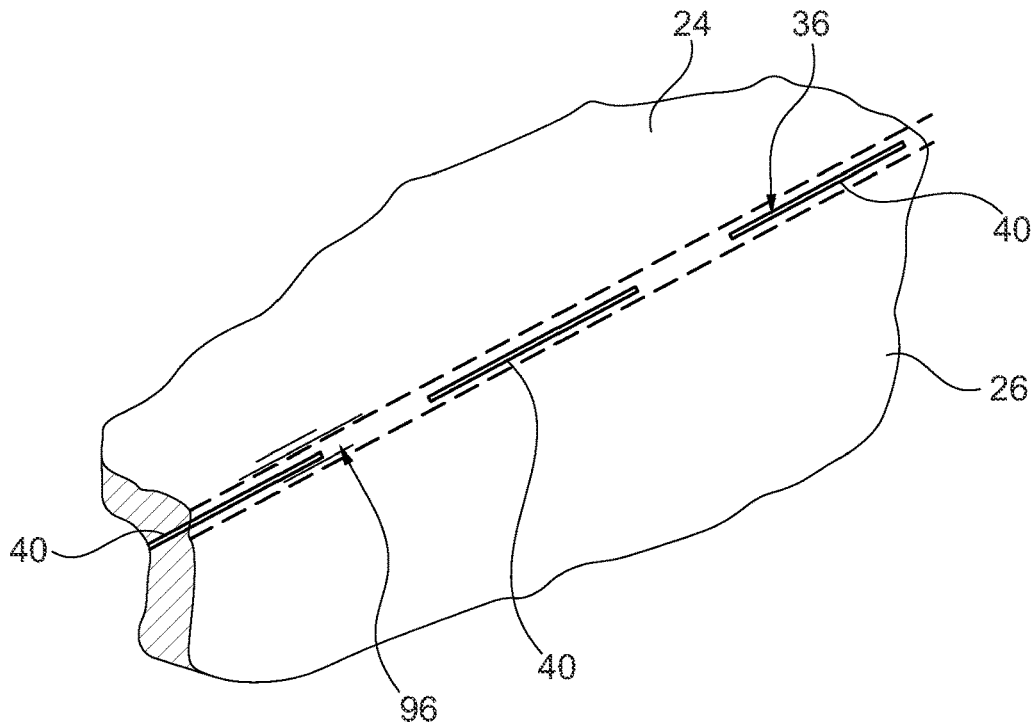
FIG. 18 is the view according to FIG. 16 in the folded state.

FIG. 15 shows a tool 88 which is provided to form the perforations 36 belonging to the respective panel element 24, during or after step D described above. The tool 88 is formed with a bar-like base body 90. Slitting blades 92 project downwards, based on FIG. 15, from the base body 90. The slitting blades 92 are located one behind the other along the longitudinal extent of the base body 90 and project vertically from the base body 92. By means of the slitting blades 92, the above-mentioned slots 40 are formed as simple, linear elongate slots on perforation of the panel element 24.

At the transition from the base body 90 to the slitting blade 92, the base body 90 further has an elongate groove punch 94, which is V-shaped when seen in cross-section. By means of this groove punch 94, a continuous groove 96 is additionally formed during punching of the perforation 36, which groove is then likewise V-shaped in cross-section. The groove 96 thus extends directly along the perforation 36 and facilitates bending of the panel edge 26 as fastening means 28 on the remainder of the panel element 24.

Finally, it should be noted that all the features which are mentioned in the application documents and in particular in the dependent claims are also to be accorded independent protection, individually or in any desired combination, despite the formal dependency which has been undertaken.

LIST OF REFERENCE NUMERALS

A providing plastics raw material
B felting a needle felt layer
C compressing the needle felt layer with the input of heat
D punching a panel element
10 cat furniture
12 cat
14 base element
16 three-dimensional structure
18 foot elements
20 trunk element
22 trunk root
24 panel elements
26 panel edge
28 fastening means
30 through-openings
32 floor or wall plate
34 base plate
36 perforation
38 basic form
40 slot 42 first side
44 second side
46 third side
48 fourth side
50 fastening points
52 connecting element
54 equilateral triangle
56 first side length
58 isosceles triangle
60 first base length
62 first basic form
64 second basic form
66 connecting edge
68 third basic form
70 screw element
72 screw
74 screw sleeve
76 inside thread
78 screwdriver
80 adhesive material
82 point pattern
84 spacing
86 point
88 tool
90 base body
92 slitting blade
94 groove punch
96 groove

The invention claimed is:

1. A cat furniture item (10), comprising:
a first panel element (24), comprising
a first base plate (34) including at least two triangular basic forms (38) connected to one another at a connecting edge (66) formed by a perforation (36), and
a first fastening means (28) connected in a foldable manner to the first base plate (34); and
a second panel element (24), comprising
a second base plate (34) extending in a second plane, and
a second fastening means (28) connected in a foldable manner to the second panel element (24),
wherein, in a pre-assembled state,
the first fastening means (28) and the first base plate (34) are arranged in a first plane and the first fastening means (28) is attached to the first panel element (24) via a first perforation (36) and via a first groove (96) extending along the first perforation (36), and
the second fastening means (28) is arranged in the second plane and attached to the second panel element (24) via a second perforation (36) and via a second groove (96) extending along the second perforation (36), and
wherein, in an assembled state,
the first panel element (24) is connected to the second panel element (24) to jointly form a three-dimensional structure (16),
the at least two triangular basic forms (38) are pivoted against one another along the connecting edge (66),
the first fastening means (28) is pivoted along the first groove (96) out of the first plane,
the second fastening means (28) is pivoted along the second groove (96) out of the second plane, and
the first fastening means (28) abuts and is connected to the second fastening means (28).

2. The cat furniture item according to claim 1, wherein the first perforation (36) is formed by individual slots (40) having a slot length between 1.0 mm and 1.8 mm.

3. The cat furniture item according to claim 1, wherein the first perforation (36) is formed by individual slots (40) having a slot length between 1.3 mm and 1.5 mm.

4. The cat furniture item according to claim 1, wherein the first perforation (36) is formed at an end of a first panel edge (26) by a slot (40) having a slot length of between 0.5 mm and 0.9 mm.

5. The cat furniture item according to claim 1, wherein the first perforation (36) is formed at an end of a first panel edge (26) by a slot (40) having a slot length between 0.6 mm and 0.8 mm.

6. The cat furniture item to claim 1, wherein the first perforation (36) is formed by ties and slots with individual ties having a tie length of between 0.2 mm and 0.8 mm.

7. The cat furniture item to claim 1, wherein the first perforation (36) is formed by ties and slots with individual ties having a tie length of between 0.4 mm and 0.6 mm.

8. The cat furniture item according to claim 1, wherein the at least two triangular basic forms (38) are two first isosceles triangles, each having two legs having first leg lengths and a base having a first base length, the connecting edge (66) being formed along the base, and
wherein the second base plate is in form of an equilateral triangle having three first side lengths, and
wherein the first leg lengths each correspond to the first side lengths.

9. The cat furniture item according to claim 8, further comprising a third panel element having a third base plate in form of a second isosceles triangle having two second leg lengths and a second base length, and
wherein the second leg lengths each correspond to the first base length.

10. The cat furniture item according to claim 1, wherein the first fastening means (28) is connected to the second fastening means (28) by a screw sleeve (74) and a screw (72).

11. A cat tree (10), comprising:
a base element (14); and
a plurality of three-dimensional structures (16),
wherein the base element (14) comprises
a planar trunk element (20); and
planar foot elements (18) abutting the planar trunk element (20) at a right angle,
wherein the three-dimensional structures (16) are composed of a plurality of modular panel elements (24),
wherein a first of the modular panel elements (24) includes
an equilateral triangular first base plate (34) and
three first trapezoidal fastening means (28), one of the three first trapezoidal fastening means (28) being attached to each side of the first base plate (34) via a first perforation (36) and via a first groove (96) extending along the first perforation (36), and
wherein a second of the modular panel elements (24) includes
an isosceles triangular second base plate (34) and
three second trapezoidal fastening means (28), one of the three second trapezoidal fastening means (28) being attached to each side of the second base plate

(34) via a second perforation (36) and via a second groove (96) extending along the second perforation (36), and wherein a third of the modular panel elements (24) includes
- a rectangular third base plate (34) composed of two triangular basic forms (38) connected to one another at a connecting edge (66) formed by a perforation (36), and
- four third trapezoidal fastening means (28), one of the four third trapezoidal fastening means (28) being attached to each side of the third base plate (34) via a third perforation (36) and via a third groove (96) extending along the third perforation (36).

12. The cat tree (10), according to claim 11, wherein a fourth of the modular panel elements (24) includes
- a trapezoidal fourth base plate (34) composed of three equilateral triangular basic forms (38) connected to one another at connecting edges (66) formed by two perforations (36), and
- five fourth trapezoidal fastening means (28), one of the five fourth trapezoidal fastening means (28) being attached to each leg and a short base of the fourth base plate (34) and two of the five fourth trapezoidal fastening means (28) being attached to a long base of the fourth base plate (34) via a fourth perforation (36) and via a fourth groove (96) extending along the fourth perforation (36).

* * * * *